United States Patent
Schnell

[11] Patent Number: 6,135,500
[45] Date of Patent: Oct. 24, 2000

[54] SEAT-BELT ARRANGEMENT IN A MOTOR VEHICLE

[75] Inventor: Oliver Schnell, Tuebingen, Germany

[73] Assignee: DaimlerChrysler AG, Stuttgart, Germany

[21] Appl. No.: 09/357,303

[22] Filed: Jul. 20, 1999

[30] Foreign Application Priority Data

Jul. 21, 1998 [DE] Germany ............ 198 32 630

[51] Int. Cl.$^7$ .................................. B60R 22/18
[52] U.S. Cl. ............................................ 280/808
[58] Field of Search ...................... 280/808, 807

[56] References Cited

U.S. PATENT DOCUMENTS

| | | | |
|---|---|---|---|
| 4,549,749 | 10/1985 | Thomas | 280/808 |
| 4,592,571 | 6/1986 | Baumann et al. | 280/808 |
| 4,988,121 | 1/1991 | Yoshii | 280/808 |
| 5,462,310 | 10/1995 | Jaksic | 280/808 |
| 5,487,564 | 1/1996 | Fueller et al. | 280/808 |
| 5,494,316 | 2/1996 | Maesing et al. | 280/808 |
| 5,603,527 | 2/1997 | Bee | 280/808 |
| 5,758,919 | 6/1998 | Matheis | 280/808 |

FOREIGN PATENT DOCUMENTS

| | | |
|---|---|---|
| 30 41 103 | 8/1982 | Germany . |
| 195 28 715 | 2/1997 | Germany . |

OTHER PUBLICATIONS

Great Britain Patent Office Combined Search and Examination Report under Search 17 and 18(3), Oct. 8, 1999, pp. (4).

Primary Examiner—Kenneth R. Rice
Attorney, Agent, or Firm—Evenson, McKeown, Edwards & Lenahan, PLLC

[57] ABSTRACT

In order to avoid severe stressing of seat-belt straps which are placed over trim panels in motor vehicles, which may lead to the trim panel being damaged, a guide rocker is positioned in the deflecting region of the seat belt. The rocker is secured to the bodywork and is pivotably mounted in an attachment region and has two mutually opposite guide limbs. The angle of contact of the seat-belt strap against the guide limb which is on the seat-belt retractor side is greater than in the region of the guide limb which is on the trim-panel side.

18 Claims, 1 Drawing Sheet

SEAT-BELT ARRANGEMENT IN A MOTOR VEHICLE

BACKGROUND AND SUMMARY OF THE INVENTION

This application claims the priority of German patent 198 32 630, filed Jul. 21, 1998, the disclosure of which is expressly incorporated by reference herein.

The invention relates to a seat-belt arrangement in a motor vehicle, having a seat-belt retractor, which is arranged secured to the vehicle, and also having a seat-belt strap, which is deflected in the region of a trim panel and can be extended or retracted by means of the seat-belt retractor.

A seat-belt arrangement of this type may be present in individual cases, in particular in cabriolets, in which case the seat-belt strap is deflected via a trim panel arranged secured to the vehicle. The seat-belt strap is held in a manner which allows it to be extended and retracted, on a seat-belt retractor arranged secured to the bodywork. In the event of severe stressing of the seat-belt strap, the trim panel may be damaged if it is not designed or supported in a sufficiently stable manner.

A seat-belt arrangement for a motor vehicle is disclosed in German patent document DE 30 41 103 A1. The seat-belt arrangement has a seat-belt retractor which is arranged secured to the bodywork and in which a seat-belt strap is mounted in a manner which allows it to be wound up and unwound. To deflect the seat-belt strap, a deflecting surface is provided which is formed by a plurality of freely rotatable rolls arranged one behind another along a curved envelope curve. The flexing work when retracting and extending the seat-belt strap is considerably reduced because of these rolls.

In German patent document DE 195 28 715 A1 an arrangement is shown of a seat-belt retractor which is secured to the vehicle and has a seat-belt deflecting means in the region of a trim panel, which seat-belt retractor and deflecting means can be jointly pivoted, the pivoting causing the geometry at the deflecting point for the seat-belt strap to be changed in such a manner that the flexing work of the stressed seat-belt strap can be reduced by smaller contact in the deflecting region. A guide rocker, which is mounted pivotably on the bodywork side, is not provided here in the deflecting region for the seat-belt strap.

The object of the invention is to provide a seat-belt arrangement of the type described generally above, in which damage to a trim panel, on which the seat-belt strap is deflected, is avoided, in particular in the event of stressing.

This object is achieved in that a guide rocker is positioned in the deflecting region, which rocker is secured to the bodywork and is pivotably mounted in an attachment region and has two mutually opposite guide limbs, the seat-belt strap being guided over the two guide limbs and over the attachment region, and in that the guide rocker is arranged in an inclined position relative to the seat-belt retractor and relative to the trim panel in such a manner that the angle of contact of the seat-belt strap against that guide limb which is on the seat-belt retractor side is greater than in the region of that guide limb which is on the trim-panel side. According to the principles of rope friction, this ensures that in the event of the seat-belt strap being subjected to tensile stressing, the guide rocker is pressed away from the internal seat-belt retractor, so that the external strap side is removed at least by a certain amount away from the trim panel. A prerequisite is for the guide rocker in an inclined position to force the nonuniform contact because of its inherent weight. In the event of the seat-belt strap being subjected to severe tensile stressing, damage to the lining part is therefore avoided since the guide rocker presses the seat-belt strap away from the trim panel and therefore relieves the trim panel of stress.

According to certain preferred embodiments of the invention, the attachment region and the guide limbs are positioned relative to one another in a triangle in such a manner that the attachment region forms the vertex of the triangle and the guide limbs are positioned at opposite, remaining corners of the triangle. This imaginary triangle is preferably of equal-angled or equal-sided design.

According to certain preferred embodiments of the invention both the attachment region and the guide limbs are provided with rotatably mounted roller elements. Roller elements of this type can in particular be rolls or rollers.

According to certain preferred embodiments of the invention the guide rocker is designed as an integral block component. This is a particularly simple refinement, the seat-belt strap not sliding over the guide limbs and the attachment region by way of rolling friction, as in the case of the roller elements, but rather by way of sliding friction.

Other objects, advantages and novel features of the present invention will become apparent from the following detailed description of the invention when considered in conjunction with the accompanying drawings.

DETAILED DESCRIPTION OF THE DRAWINGS

Figure 1:
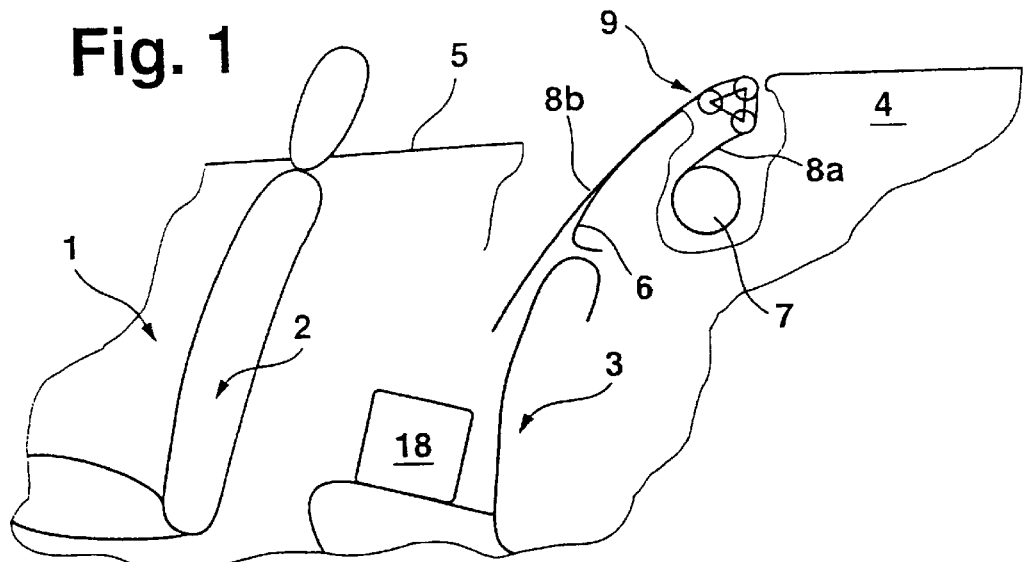
FIG. 1 is a schematic side view of a seat-belt arrangement according to a preferred embodiment of the invention, in a cabriolet.

A motor vehicle in the form of an open passenger car has a vehicle interior 1 which is provided with front seats 2 and with rear seats 3, which are designed as emergency seats. Behind the rear seats 3 there follows a rear region 4 of the vehicle bodywork, in which a folding-top compartment for accommodating a folding-top arrangement (not illustrated) is positioned (in a manner not illustrated in more detail).

The rear seats 3 are assigned at least one seat-belt arrangement which is designed as a three-point seat belt in the illustrated exemplary embodiment. The seat-belt arrangement has a seat-belt strap 8a, 8b which is designed as a shoulder-belt part in the illustrated exemplary embodiment. The seat-belt strap 8a, 8b is mounted in a manner which allows it to be retracted and extended in a seat-belt retractor 7. The seat-belt retractor 7 is mounted secured to the bodywork in a bearing region 17 behind the rear region and below a vehicle flange edge (i.e., belt line) 5 on body shell parts. The seat-belt strap 8a, 8b is guided outwards and is deflected via a guide rocker 9, the strap running along a slightly curved trim panel 6.

In certain preferred embodiments of the invention (not illustrated in further detail), the seat-belt strap constitutes a simple lashing strap which has, at its free end, a lock tongue which can be locked in a corresponding lock in the region of the rear seat. According to other exemplary embodiments of the invention, the seat-belt arrangement also does not necessarily have to be assigned to vehicle seats but may also be arranged in the region of a corresponding boot space for securing loads. However, in all cases the seat-belt retractor is arranged secured to the bodywork below a trim panel and the respective seat-belt strap is guided outwards out of the trim panel and is deflected.

The guide rocker 9 is formed by three rollers 10, 11, 12 which are mounted rotatably on a triangular framework 14 having mutually parallel rotational axes. The three rollers 10, 11, 12 are positioned at the three corners of the triangle of this framework 14. The rotational axis of the upper roller 12 at the same time forms an attachment axis at which the framework 14, and therefore the guide rocker 9, is attached such that it is secured to the bodywork, to corresponding bearings 13 which are secured to the bodywork. The framework 14 can be formed by two triangular framework parts which flank the rollers 10, 11, 12 on opposite sides, these framework parts being rigidly connected to one another by connecting axes in the region of the corners of the triangle. The respective rollers 10, 11, 12 are mounted rotatably on these connecting axes, so that the connecting axes also constitute the rotational axes of these rollers 10, 11, 12. In an extension of the rotational axis of the upper roller 12, and thus in the attachment region of the bearing 13 which is secured to the bodywork, the framework 14 itself is mounted pivotably on the respective body shell parts or on bearing blocks fixedly connected to these body shell parts, by way of outwardly protruding axis extensions. The guide rocker is held between the strap sides 8a and 8b in an inclined position according to FIG. 2.

In certain preferred embodiments of the invention, the guide rocker 9 is created by an integral block component in which the rollers 10, 11, 12 are not connected rotatably, but rather rigidly, to the framework and thus form an integral unit. An integral block component of this type may also have other forms, as long as an upper attachment region and lateral guide limbs for the seat-belt strap are formed. This guide rocker is also aligned in an inclined position.

Figure 2:
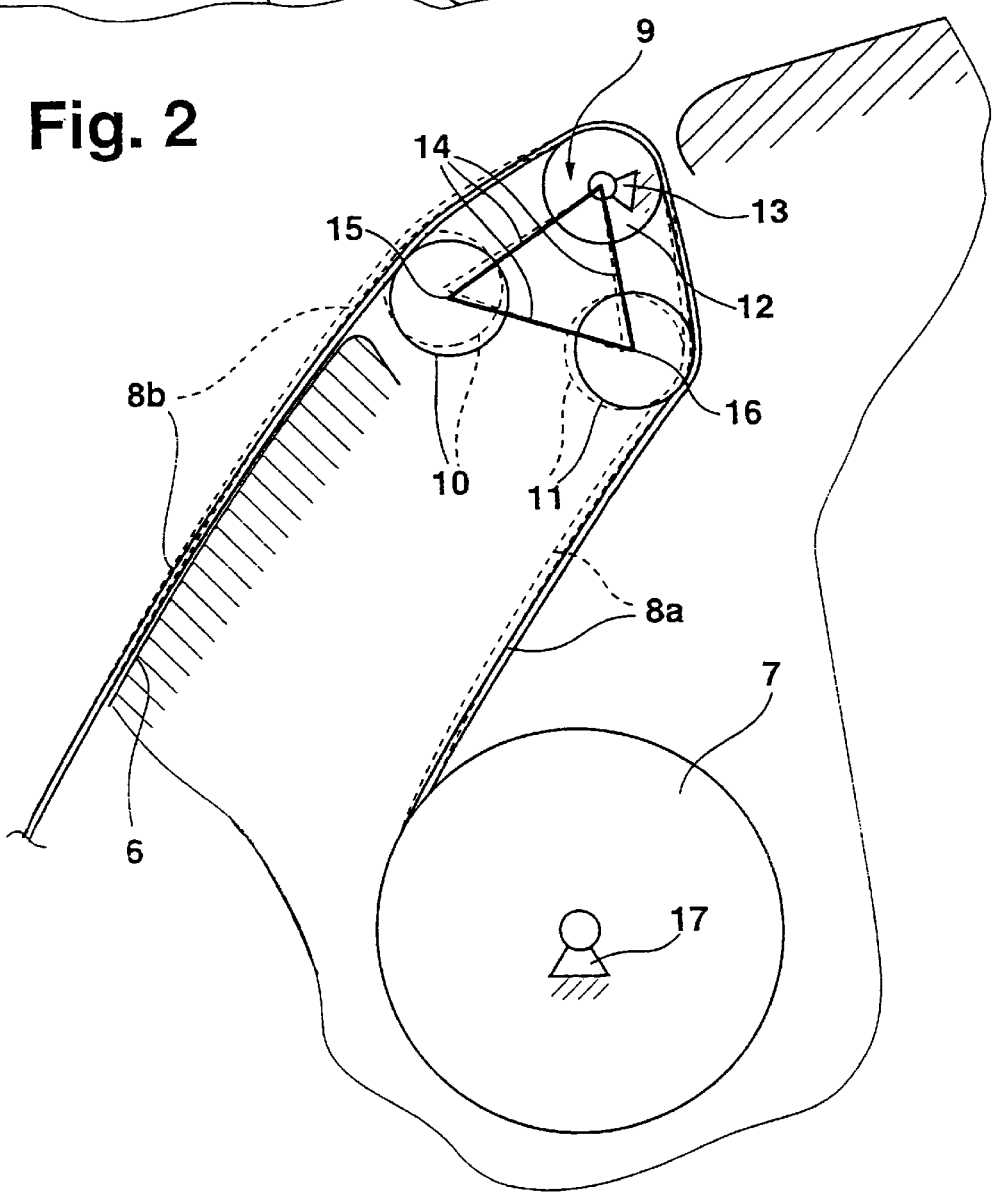
FIG. 2 is an enlarged view of the seat-belt arrangement according to FIG. 1.

In the illustrated exemplary embodiment according to FIGS. 1 and 2, the upper roller 12 forms an attachment region over which the seat-belt strap 8a, 8b is guided. A strap side 8a of the seat-belt strap, which is provided on the side of the seat-belt retractor 7, is guided over the internal roller 11, which serves as the inner guide limb. The strap side 8b of the seat-belt strap 8a, 8b which runs over the trim panel 6 is guided over the outer roller 10, which serves as an outer guide limb.

In the unstressed rest position of the seat-belt strap, the seat-belt strap is merely stressed by the restoring forces of the seat-belt retractor 7. The free end of the seat-belt strap is arranged in a manner known per se secured to the vehicle in the region of the rear seat 3. In this unstressed rest position, the strap side 8b runs upwards along the backrest of the rear seat 3 and along the outside of the trim panel 6, the guide rocker 9 being positioned in a balanced state in which those circumferential sections of the rollers 10 and 12 which come into contact with the strap side 8b are aligned approximately with the external contour of the trim panel 6. In the region of the internal guide limb (i.e., in the region of the internal roller 11), the inner seat-belt strap side 8a is more highly deflected, due to the additionally effective inherent weight of the inclined guide rocker 9 (i.e., the gravitational pull on the guide rocker 9 mounted rotatably about bearing 13), so that the internal roller 11 is surrounded by an increased angle of contact of the seat-belt strap as compared to the roller 10.

If the seat-belt strap 8a, 8b is securing a person or load 18 on the rear seat 3 and the vehicle experiences a severe deceleration, a corresponding detent pawl of the seat-belt retractor 7 locks in a manner known per se, as a result of which the seat-belt strap 8a, 8b is subjected to severe tensile stressing. By means of this severe tensile stressing, the guide rocker 9 is aligned in a new balanced state in which the guide rocker 9 is pivoted in the clockwise direction (illustration according to FIG. 2) around the attachment axis 13, as a result of which the outer roller 10 and the inner roller 11 are pressed outwards, in accordance with the dashed-line illustration. The severe tensile forces overcome the inherent weight of the guide rocker 9, so that the inherent weight can be neglected during the deceleration stressing. At the same time the strap side 8b is pushed away outwards from the trim panel 6, so that it is also not possible for severe tensile stressing on the strap side 8b to cause damage to the trim panel 6. After the severe stressing on the seat-belt strap is removed, the guide rocker 9 is again moved back into the original balanced state, among other things the decisive factor in both cases being those forces and torques, which occur with the different angles of contact because of rope friction, on the lower rollers 10, 11. The essential feature for the functioning of the guide rocker 9 is therefore also for the guide limbs in each case to be arranged spaced apart from the attachment region.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Seatbelt arrangement in a motor vehicle, comprising:

a seatbelt retractor fixed to the vehicle;

a seatbelt strap extendable from and retractable into said seatbelt retractor, said seatbelt strap being deflected proximate a trim panel; and a guide rocker positioned proximate said trim panel, said guide rocker being secured to the vehicle and being pivotably mounted in an attachment region, said guide rocker having two mutually opposite guide limbs, the seatbelt strap being guided over the two guide limbs and over the attachment region, the guide rocker being arranged in an inclined position relative to the seatbelt retractor and relative to the trim panel such that in an unloaded rest position, an angle of contact of an inner portion of the seatbelt strap against an internal one of the guide limbs which is located toward the seatbelt retractor is greater than an angle of contact of an outer portion of the seatbelt strap against an outer one of the guide limbs located toward the trim panel.

2. Seatbelt arrangement according to claim 1, wherein the attachment region and the guide limbs are positioned relative to one another in a triangle such that the attachment region forms the vertex of the triangle and the guide limbs are positioned at opposite, remaining corners of the triangle.

3. Seatbelt arrangement according to claim 1, wherein both the attachment region and the guide limbs comprise rotatably mounted roller elements.

4. Seatbelt arrangement according to claim 2, wherein both the attachment region and the guide limbs comprise rotatably mounted roller elements.

5. Seatbelt arrangement according to claim 1, wherein the guide rocker is designed as an integral block component.

6. Seatbelt arrangement according to claim 2, wherein the guide rocker is designed as an integral block component.

7. Guide rocker arrangement for a seatbelt arrangement in a motor vehicle having a retractor fixed to the vehicle, a seatbelt strap extending from said retractor and passing over a trim panel in an interior of the motor vehicle, said guide rocker comprising:

a guide rocker arranged proximate an upper side of the trim panel, said guide rocker having three guide surfaces which engage the seatbelt strap, said guide surfaces being arranged in a generally triangular configuration as an upper guide surface, and two lower guide surfaces including an inner guide surface arranged nearer the seatbelt retractor and an outer guide surface arranged nearer the trim panel, said guide rocker being pivotably mounted on the vehicle at a bearing proximate said upper guide surface.

8. Guide rocker arrangement according to claim 7, wherein the guide rocker is arranged in an inclined position relative to the seatbelt retractor and relative to the trim panel such that in an unloaded rest position, an angle of contact of an inner portion of the seatbelt strap against an said inner guide surface is greater than an angle of contact of an outer portion of the seatbelt strap against said outer guide surface.

9. Guide rocker arrangement according to claim 7, wherein each of said three guide surfaces comprises a rotatable mounted roller element.

10. Guide rocker arrangement according to claim 8, wherein each of said three guide surfaces comprises a rotatably mounted roller element.

11. Guide rocker arrangement according to claim 7, wherein the guide rocker is designed as an integral block component.

12. Guide rocker arrangement according to claim 8, wherein the guide rocker is designed as an integral block component.

13. Method of arranging a guide rocker for a seatbelt arrangement in a motor vehicle having a retractor fixed to the vehicle, a seatbelt strap extending from said retractor and passing over a trim panel in an interior of the motor vehicle, said method comprising:

arranging a guide rocker proximate an upper side of the trim panel, said guide rocker having three guide surfaces which engage the seatbelt strap, said guide surfaces being arranged in a generally triangular configuration as an upper guide surface, and two lower guide surfaces including an inner guide surface arranged nearer the seatbelt retractor and an outer guide surface arranged nearer the trim panel, pivotably mounting said guide rocker on the vehicle at a bearing proximate said upper guide surface.

14. Method according to claim 13, wherein the guide rocker is arranged in an inclined position relative to the seatbelt retractor and relative to the trim panel such that in an unloaded rest position, an angle of contact of an inner portion of the seatbelt strap against an said inner guide surface is greater than an angle of contact of an outer portion of the seatbelt strap against said outer guide surface.

15. Method according to claim 13, wherein each of said three guide surfaces comprises a rotatably mounted roller element.

16. Method according to claim 14, wherein each of said three guide surfaces comprises a rotatably mounted roller element.

17. Method according to claim 13, wherein the guide rocker is designed as an integral block component.

18. Method according to claim 14, wherein the guide rocker is designed as an integral block component.

* * * * *